(12) United States Patent
Su

(10) Patent No.: US 12,620,196 B2
(45) Date of Patent: May 5, 2026

(54) METHOD FOR DETECTING AN OBJECT IN A SEARCH IMAGE, METHOD FOR GENERATING A PATTERN VECTOR, AND USE OF A METHOD FOR DETERMINING A POSITION AND/OR ORIENTATION OF A SECURITY ELEMENT OF A BANKNOTE

(71) Applicant: GIESECKE+DEVRIENT CURRENCY TECHNOLOGY GMBH, Munich (DE)

(72) Inventor: Shanchuan Su, Neubiberg (DE)

(73) Assignee: GIESECKE+DEVRIENT CURRENCY TECHNOLOGY GMBH, Munich (DE)

( * ) Notice: Subject to any disclaimer, the term of this patent is extended or adjusted under 35 U.S.C. 154(b) by 274 days.

(21) Appl. No.: 18/549,456

(22) PCT Filed: Mar. 2, 2022

(86) PCT No.: PCT/EP2022/025074
§ 371 (c)(1),
(2) Date: Sep. 7, 2023

(87) PCT Pub. No.: WO2022/189035
PCT Pub. Date: Sep. 15, 2022

(65) Prior Publication Data
US 2024/0185562 A1 Jun. 6, 2024

(30) Foreign Application Priority Data
Mar. 9, 2021 (DE) ..................... 10 2021 001 256.9

(51) Int. Cl.
*G06V 10/75* (2022.01)
*G07D 7/00* (2016.01)

(52) U.S. Cl.
CPC ........... *G06V 10/751* (2022.01); *G07D 7/003* (2017.05)

(58) Field of Classification Search
CPC .. G06V 10/751; G06V 30/148; G06V 30/199; G07D 7/003; G07D 7/206; G07D 7/2016
See application file for complete search history.

(56) References Cited

U.S. PATENT DOCUMENTS

2016/0307035 A1* 10/2016 Schilling ................ B42D 25/36

FOREIGN PATENT DOCUMENTS

| DE | 102013113340 A1 | 6/2015 |
| JP | 2002230549 A | 8/2002 |

OTHER PUBLICATIONS

Abdou, Ikram et al., "Quantitative Design and Evaluation of Enhancement/Thresholding Edge Detectors", Proceedings of the IEEE, vol. 67, No. 5, May 1, 1979, pp. 753-763.

(Continued)

*Primary Examiner* — Han Hoang
(74) *Attorney, Agent, or Firm* — Workman Nydegger

(57) ABSTRACT

A method for detecting an object in a search image, includes: a) providing a pattern vector which describes the object by means of coordinates of characteristic pixels; b) shifting the pattern vector over different positions of the search image; c) determining a success value at each of the different positions; and d) detecting the object at the position on the basis of the success value, wherein each characteristic pixel is assigned a first direction and a second direction that differs from the first direction. The first and second overall intensity values of one-dimensionally arranged pixels are determined in the first and second directions, respectively. A difference value between the first and second overall intensity values is determined in each case, and the success value is determined on the basis of the respective difference values.

11 Claims, 4 Drawing Sheets

(56) References Cited

OTHER PUBLICATIONS

Grigoryan et al., "Asymmetric and Symmetric Gradient Operators with Application in Face Recognition in Renaissance Portrait Art", Mobile Multimedia/Image Processing, Security, and Applications 2019, Apr. 1, 2019, pp. 1-27.

Hashimoto, Manabu et al., "High-Speed Template Matching Algorithm Using Information of Contour Points", Systems and Computers in Japan, vol. 23, No. 9, May 1, 1992, pp. 78-87.

German Office Action from corresponding German Patent Application No. DE102021001256.9, Jan. 26, 2022.

International Search Report from corresponding PCT Application No. PCT/EP2022/025074, Jun. 23, 2022.

* cited by examiner

METHOD FOR DETECTING AN OBJECT IN A SEARCH IMAGE, METHOD FOR GENERATING A PATTERN VECTOR, AND USE OF A METHOD FOR DETERMINING A POSITION AND/OR ORIENTATION OF A SECURITY ELEMENT OF A BANKNOTE

BACKGROUND

The invention relates to a method for detecting an object in a search image. A pattern vector is provided, which describes the object by way of coordinates of characteristic pixels. The pattern vector is displaced over various positions of the search image. Furthermore, a respective success value is determined at the various positions and the object is detected at the position on the basis of the success value. The invention also relates to a method for generating a corresponding pattern vector. Moreover, the invention relates to a use of a corresponding method for determining a position and/or orientation of a security element of a banknote.

Methods for detecting an object are known. This field is thus also generally known under the term pattern recognition or object recognition in digital images.

One known method is the Viola-Jones method. Using the Viola-Jones method, noteworthy objects such as faces can be detected in a digital image. The core of the Viola-Jones method are Viola-Jones base patterns, which are partially based on so-called hair wavelets. Hair wavelets are single wavelets which are formed from the combination of two rectangular functions.

It is intended in particular hereinafter that objects be detected under changing illumination conditions. One challenge in this case is that the same object is thus depicted once light against a dark background and another time dark against a light background.

Known methods have proven to be slow or unreliable again and again under these conditions.

SUMMARY

The object is to detect an object which can be depicted in a digital image with different brightnesses depending on the illumination faster and more reliably.

This object is achieved according to the invention by a respective method having the features according to the independent claims. Advantageous embodiments of the invention are the subject matter of the dependent claims.

In a method according to the invention, an object, in particular an object of a banknote, is detected in a search image. The following steps are carried out:

a) providing a pattern vector or a pattern matrix, which describes the object by way of coordinates of characteristic pixels;

b) displacing the pattern vector over various positions of the search image;

c) defining a respective success value at the various positions; and d) detecting the object at the position on the basis of the success value, in particular the maximum success value.

One important concept of the invention is that, in particular by the pattern vector, each characteristic pixel is assigned a first direction and a second direction different from the first direction, wherein in each case a first intensity overall value of a first number of one-dimensionally arranged pixels in the first direction is determined and a second intensity overall value of a second number of one-dimensionally arranged pixels in the second direction is determined, wherein in each case a difference value, in particular and/or a ratio value, is determined between the first intensity overall value and the second intensity overall value, wherein the success value is determined on the basis of the respective difference values, in particular and/or the respective ratio values.

The invention is based on the finding that sufficient features in order to detect the object or the position and/or orientation in the search image are provided solely by the coordinates, thus the position of the characteristic pixels and the directions to form the difference value.

During the generation of the pattern vector or the classifier, in particular pixels on edges or at points having a high frequency, i.e., a transmission from light to dark or dark to light, are selected as characteristic pixels. These characteristic pixels or the pattern, which is two-dimensional in particular, of the characteristic pixels, thus the point cloud spanned by the coordinates of the characteristic pixels, are or is then found again in the search image. For this purpose, it is not necessary to specify a specific value of the differences of the pixels of the different directions per characteristic pixel. The respective position of the characteristic pixels and the respective associated direction are sufficient.

The number of the pixels of the respective direction which are to be used for the difference value can either likewise be provided by the pattern vector or also specified as a general standard setting.

In particular, it is provided that the first intensity overall value and/or the second intensity overall value is formed by a mean value, for example an arithmetic mean value or a median value.

The success value can, for example, be formed directly from the difference values, for example by summing and optional norming. The success value can also be generated in dependence on the weighting function, however, in which the difference values are incorporated in weighted form.

It is preferably provided that the maximum difference value of the difference values results in a success value at which the object is detected. By way of the maximum difference value, the position of the characteristic pixels is found at which the respective intensity difference between the pixels of the first direction and the pixels of the second direction is greatest.

Because the characteristic pixels are preferably already selected according to the criterion of the maximum difference values when generating the pattern vector according to the further method of the invention, it is sufficient in the search image to find the position of the characteristic pixels at which the difference value is maximum.

Furthermore, it is preferably provided that the first direction and the second direction are assigned in opposition by 180°. Due to the preferably quasi-diametric arrangement, a more informative difference value can be generated for each characteristic pixel. The object can thus be detected more reliably.

Furthermore, it is preferably provided that the first number and/or the second number is defined as greater than one. At a number greater than one, in particular two, thus, for example, three, four, or five, the characteristic pixel can be defined more reliably at a noteworthy pixel, thus, for example, an edge or corner, thus a high-frequency image area.

Furthermore, it is preferably provided that the first number and/or the second number is defined as less than ten, in particular six. Due to the restriction of the first number and/or the second number, on the one hand, the effort for determining the difference values can be limited, both when generating the pattern vector and when detecting the object in the search image. On the other hand, the supply of suitable characteristic pixels can thus be kept sufficiently large that the pattern vector can be generated using a sufficiently large number, for example at least 10 to 100, of characteristic pixels.

Furthermore, it is preferably provided that the first number and/or the second number is defined differently. Thus, for example, more pixels can be in the direction having lower intensity than pixels in the direction having higher intensity, and vice versa. The pattern vector may thus be adjusted individually to a specific object. As a result, the object or the position and/or orientation of the object can be detected or found more reliably.

Furthermore, it is preferably provided that the pattern vector has at most four values for each characteristic pixel. In this case, the pattern vector can in each case have only one x coordinate value of the characteristic pixel, one y coordinate value of the characteristic pixel, one first relative value for the first direction relative to the respective characteristic pixel, and one second relative value for the second direction relative to the respective characteristic pixel. As a general specification, all pixels adjoining a characteristic pixel can be numbered for the first relative value and/or the second relative value, for example. In a neighborhood of eight, these are eight numbers, for example. It can thus be specified as a specification, for example, that the value three always refers to the adjacent pixel at 3 o'clock, thus on the right adjacent to the reference pixel.

Furthermore, it is preferably provided that a security element of a banknote is detected as the object. Security elements of banknotes are typically provided with special security features, which can only be reproduced or reprinted or embossed only with difficulty without complex devices. One popular security element of a banknote is, for example, a hologram. A hologram is intentionally manufactured in such a way that light is reflected differently depending on the light angle of incidence. This is a challenge for the automatic detection of such a security element using known methods by, for example, a banknote processing device. The security element can be detected more reliably using the method for detecting the object.

Furthermore, it is preferably provided that the object is detected on a banknote. Banknotes typically have a heterogeneous background, since each area on the banknote substrate is to be used in order to apply information there, for example a specification of the denomination or of the serial number, and/or a security element and/or a security feature. This heterogeneity can also be a challenge for known methods, since the object is difficult to distinguish from the background. The security element can be detected more reliably using the method for detecting the object.

Additionally or alternatively, a ratio value can also be determined for the difference value. A ratio is then formed from the first intensity overall value and the second intensity value. For example, the first intensity overall value is divided by the second intensity value or vice versa. The success value is then determined on the basis of the ratio value.

In a further method according to the invention, a pattern vector is generated. The following steps are carried out:

a) defining a contour of an object, in particular an object of a banknote, in a pattern image;

b) defining a gradient direction for pixels of the contour;

c) defining a gradient amount for pixels of the contour;

d) defining pixels of the contour as characteristic pixels if the respective gradient amount is greater than an amount threshold value;

e) defining a respective position of the characteristic pixels;

f) defining a first direction and a second direction in dependence on the gradient direction of the characteristic pixels; and g) generating the pattern vector using, in particular only using, the position of the characteristic pixels in the pattern image and the first direction and the second direction.

The object in the pattern image can also be designated as the pattern object.

The further method can also be designated as the training phase.

The generated pattern vector can then be provided in the method according to the invention for detecting an object.

It is preferably provided that the pattern vector is generated using the first direction and/or the second direction, in particular only these, relative to the associated characteristic pixel.

In particular, it is provided that the first direction always points toward low intensity values in comparison to the second direction, while the second direction always points toward high intensity values in comparison to the first direction.

The invention also relates to a use. In the use according to the invention, the method according to the invention is used to detect an object in a search image to determine a position and/or orientation of a security element of a banknote relative to a substrate of the banknote.

To detect the orientation, the pattern vector or the search window is applied pivoted or rotated in predetermined steps. The orientation is then preferably detected at the rotation having the highest success value.

The method according to the invention for detecting an object in a search image is in particular used in a banknote processing device.

The preferred embodiments presented with reference to the method according to the invention and the advantages thereof apply accordingly, if applicable, to the further method according to the invention and the use according to the invention. The preferred embodiments presented with reference to the further method according to the invention and the use according to the invention and the advantages thereof apply accordingly to the method according to the invention.

Further features of the invention result from the claims, the figures, and the description of the figures.

BRIEF DESCRIPTION OF THE DRAWINGS

Exemplary embodiments of the invention are explained in more detail hereinafter on the basis of a schematic drawing. In the figures.

DETAILED DESCRIPTION OF VARIOUS EMBODIMENTS

In the figures, identical or functionally identical elements are provided with identical reference signs.

Figure 1:
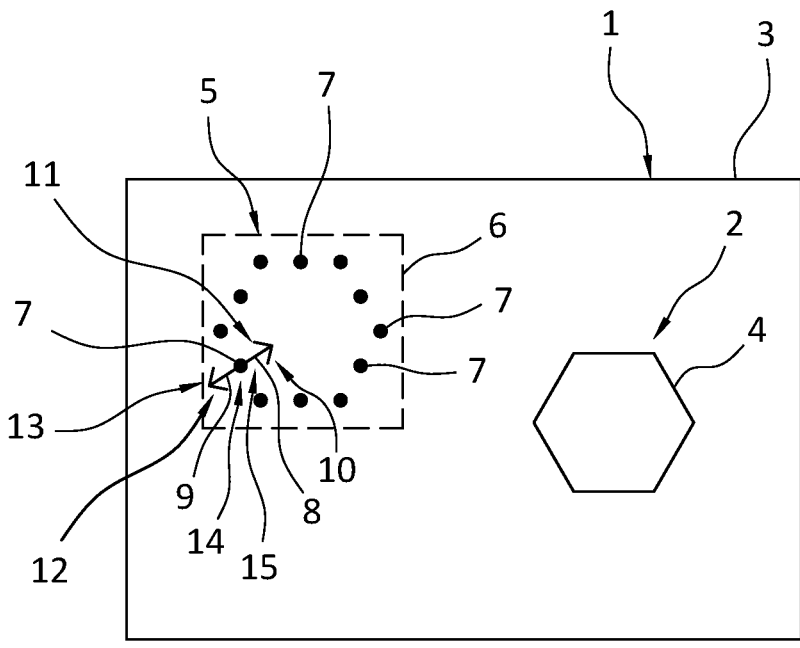
FIG. 1 shows a schematic illustration of a search image having an object, over which a pattern vector is displaced.

FIG. 1 schematically shows a search image 1 having an object 2.

According to the exemplary embodiment, the search image 1 is formed in particular as a recording of a banknote 3.

The recording can be formed as a single-channel grayscale image, multichannel color image, or multispectral image. The recording is recorded using a camera, for example. The camera can be part of a banknote processing device.

The object 2 is formed in particular as a security element 4 of the banknote 3. The security element 4 can be formed, for example, as a printing feature, security strip, security thread, film patch, hologram, and/or security embossing.

According to the exemplary embodiment, a pattern vector 5 is displaced over the search image 1. The window 6 spanned by the pattern vector 5 or the area spanned by the pattern vector is, for example, rectangular and two-dimensional. Furthermore, the window 6 is preferably smaller than the search image 1.

The pattern vector 5 has coordinates (x, y) of characteristic pixels 7.

The window 6 spanned by the pattern vector 5 is thereafter displaced over the search image 1. In particular, the pattern vector is displaced to all points of the search image 1 and executed there.

Upon the execution of the pattern vector 5 in the search image 1, a first direction 8 and a second direction 9 different from the first direction 8 is observed for each characteristic point 7. The directions 8, 9 are formed in particular as the relative direction with respect to the respective characteristic pixel 7. Furthermore, the directions are in particular comprised by the pattern vector 5 or are provided thereby.

According to the exemplary embodiment, a first intensity overall value 10 of a first number 11 of one-dimensionally arranged pixels in the first direction 8 is defined for each characteristic pixel 7. The first number 11 can have, for example, a value from one to twenty, preferably two to ten, in particular three to six. One-dimensional means in particular that the pixels are arranged along the line. The first intensity overall value 10 can be formed, for example, by an arithmetic mean value or a median value over the respective intensity values of the pixels.

Similarly to the first intensity overall value 10, a second intensity overall value 12 of a second number 13 of one-dimensionally arranged pixels in the second direction 9 is defined. The second number 13 can be different from the first number 11.

The pixels of the first number 11 of pixels in the first direction 8 can be designated as lead points. The pixels of the second number 13 of pixels in the second direction 9 can be designated as trail points.

The first number 11 and/or the second number 13 can be comprised by the pattern vector 5. Additionally or alternatively, the first number 11 and/or the second number 13 can be specified only once in general for all characteristic pixels

7. The first number 11 and/or the second number 13 can also be specified individually for each of the characteristic pixels 7, however.

Furthermore, a difference value 14 is defined according to the exemplary embodiment for each characteristic pixel 7. The difference value 14 is defined as the difference of the first intensity overall value 10 and the second intensity overall value 12.

The mathematical absolute value can optionally be formed from the difference value 14.

According to the exemplary embodiment, a success value 15 is now defined on the basis of the difference values 14. According to the exemplary embodiment, a high success value 15 means that a high level of correspondence of the pattern vector 5 and the object 2 in the search image 1 exists. In particular, the position of the object 5 is assumed at the location of the highest success value 15. The success value 15 can be formed, for example, by summing the difference values 14. Optionally, the summed difference values 14 can be normed.

Additionally, the difference values 14 can also be incorporated in weighted form in the success value.

The statement of the difference values 14 or the success value 15 is ultimately that the position of the object is assumed to be where the pattern of the characteristic pixels 7 is at the point having the highest contrast or the highest frequency.

The method may also be described as follows on the basis of formulas.

$$p(x, y) = \mathrm{argmax}\ \{S(x_i, y_i)\},\ (i,\ j) \in [-d,\ +d]$$

$$S(x, y) = \sum_{g=0}^{N} (L_g(x, y) * l_g - T_g(x, y) * t_g) * W_g)$$

$$L_g(x, y) = \sum_{i=0}^{m_g} LP_g(x_i, y_i)$$

$$T_g(x, y) = \sum_{i=0}^{n_g} TP_g(x_i, y_i)$$

with x=line pixel coordinate y=column pixel coordinate d=size of the window 6 l=scaling parameter t=scaling parameter

W=weighting parameter

LP=pixels of the first number 11 of pixels along the first direction 8

TP=pixels of the second number 13 of pixels along the second direction 9

The method can be designated as Location Matching Point Groups, abbreviated LPMG.

Figure 2:
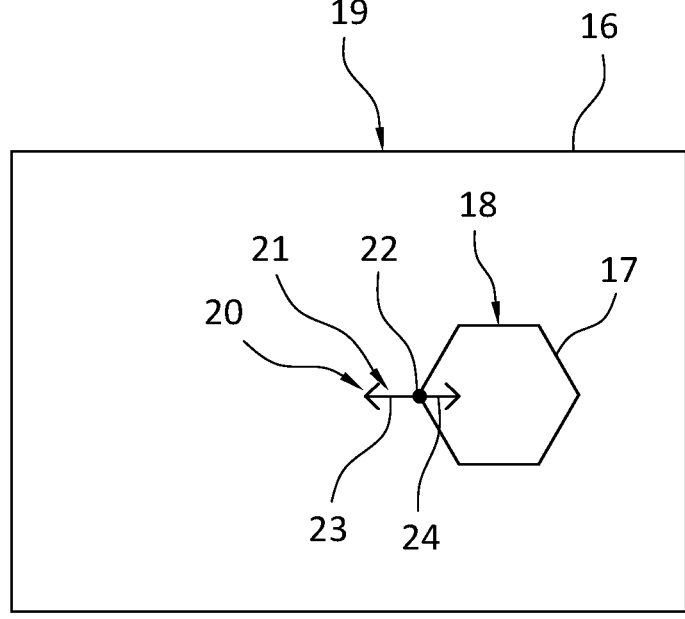
FIG. 2 shows a schematic illustration of a pattern image having an object, on the basis of which a pattern vector is generated.

FIG. 2 shows a pattern image 16, on the basis of which the pattern vector 5 is generated. The pattern image 16 can be formed as a banknote.

A contour 17 of an object 18 of a banknote 19 is defined in the pattern image 16. The contour can be defined, for example, by a morphological filter, for example a Sobel operator, or a manifold edge detector.

Furthermore, a gradient direction 20 is defined for the pixels of the contour 17. The gradient direction 20 specifies in particular in which direction the greatest brightness difference runs. In other words, the gradient direction 20 is preferably determined in the direction of the maximum gradient amount.

Furthermore, a gradient amount 21 is defined for the pixels of the contour 17. The gradient amount 21 specifies how large the brightness difference is.

In a further step, pixels of the contour 17 are defined as characteristic pixels 22 if the respective gradient amount 21 is greater than an amount threshold value. Only the most noteworthy pixels are defined or selected as the characteristic pixels 22 according to the exemplary embodiment due to the amount threshold value.

Furthermore, a respective position of the previously defined or selected characteristic pixels 22 is defined. This can be carried out, for example, by acquiring in each case line pixel coordinates and column pixel coordinates of the respective characteristic pixel 22.

In a further step, a first direction 23 and a second direction 24 is defined in dependence on the gradient direction 20. The directions 23, 24 are preferably defined in opposition. Furthermore, the directions 23, 24 are preferably defined perpendicular to the contour 17.

In a further step, the pattern vector 5 is generated using the position of the characteristic pixels 22 in the pattern image 16 and the first direction 23 and the second direction 24.

The pattern vector 22 can then be applied in the search image 1 to detect the object 2.

The object 2 in the search image 1 and the object 18 in the pattern image 16 are in particular formed identically or at least similarly.

In particular, a recording distance and/or a recording angle for the recording of the search image 1 and the pattern image 16 are formed identically. At least the recording of the search image 1 can be carried out, for example, using a recording unit, in particular a camera, which is comprised by a banknote processing device.

Figure 3:
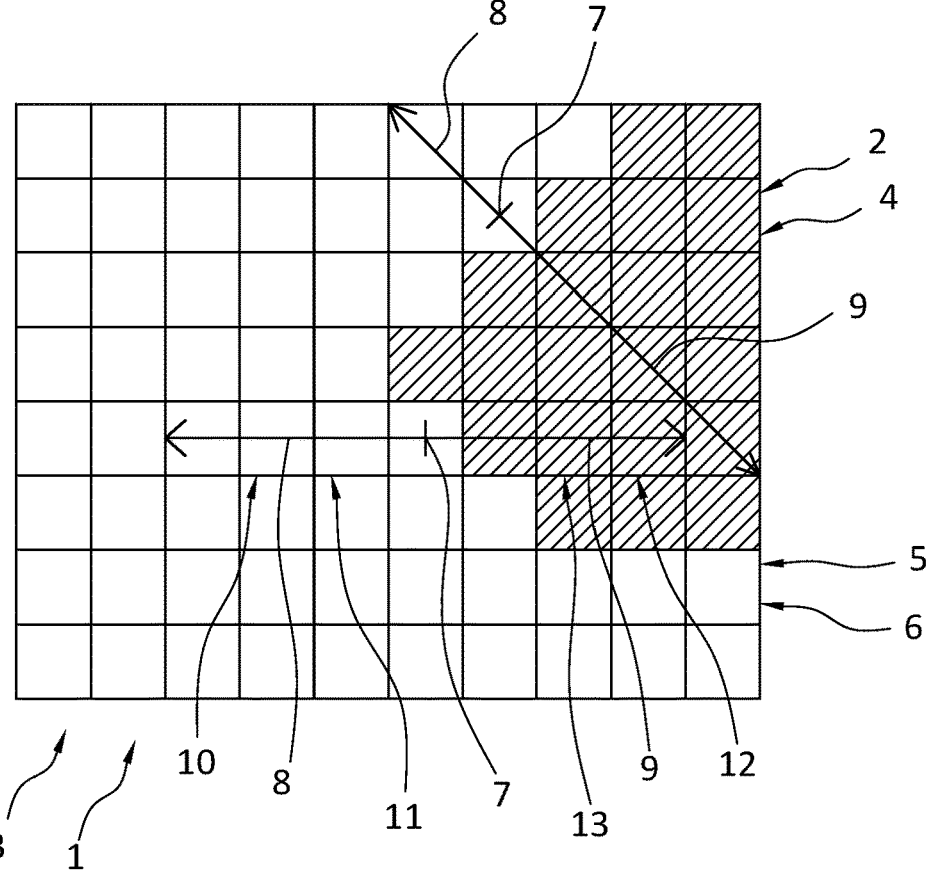
FIG. 3 shows a schematic detail illustration of the search image having the object.

FIG. 3 shows a schematic detail illustration of the search image 1. According to the exemplary embodiment, the detail of the search image 1 shown includes two characteristic pixels 7. The first number 11 is three or one. The second number 13 is three in both cases. In this case, the respective characteristic pixel 7 would not also be counted in the determination of the numbers 11, 13. However, in an alternative determination, the respective characteristic pixel 7 can also be counted. Which convention is to be applied can be established at the beginning of the method and/or stored in the pattern vector 5, for example.

For the first intensity overall value 10, for example, the intensity values of the first number 11 are then counted together. Thus in the case of an 8-bit image and three pixels, for example, 236+245+215. For the second intensity overall value 12, for example, the intensity values of the second number 13 are counted together. Thus in the case of an 8-bit image and three pixels, for example, 30+27+29. The intensity overall values 10, 12 can be normed.

Figure 4:
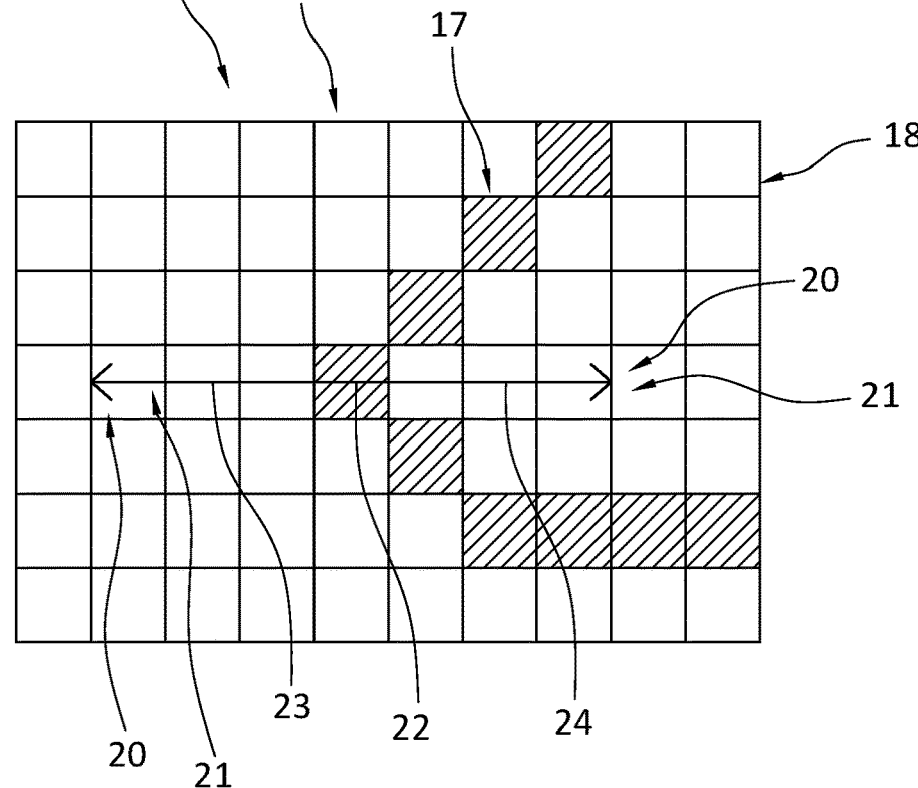
FIG. 4 shows a schematic detail illustration of the pattern image having a contour of the object.

FIG. 4 shows a schematic detail illustration of the pattern image 16. A characteristic pixel 22 is shown, which is arranged on the contour 17.

In particular, of the respective characteristic pixel 22, only the position, preferably the local coordinates with respect to the window 6, is stored together with the first direction 23 and the second direction 24 in the pattern vector 5.

Figure 5:
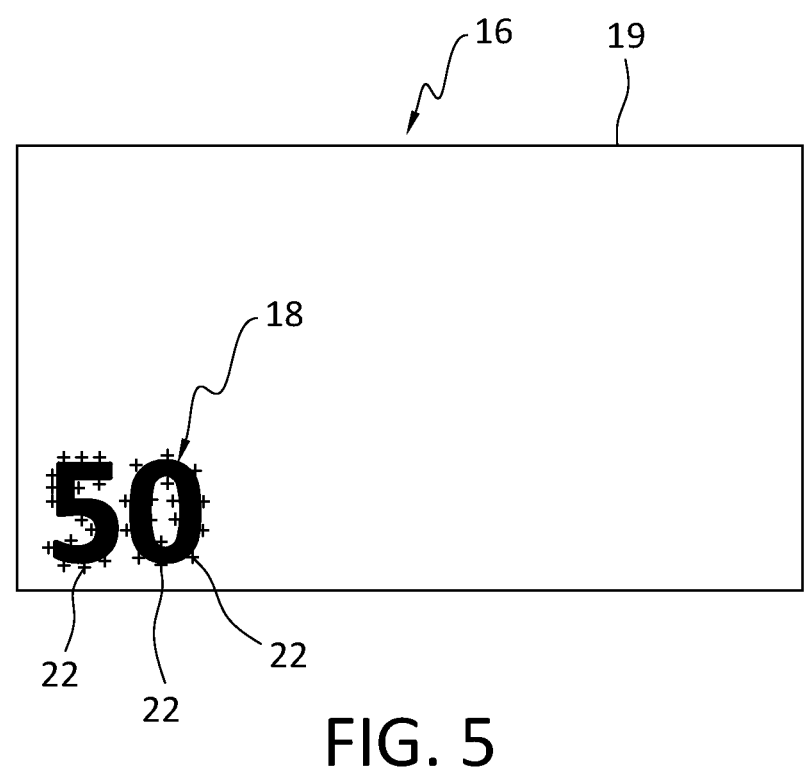
FIG. 5 shows a schematic illustration of a banknote as the pattern image.

FIG. 5 schematically shows an exemplary embodiment of the banknote 19 having the object 18 formed as the security element. The security element is formed in the exemplary embodiment as the imprint "50". The characteristic pixels 22 are each represented by a plus sign.

Figure 6:
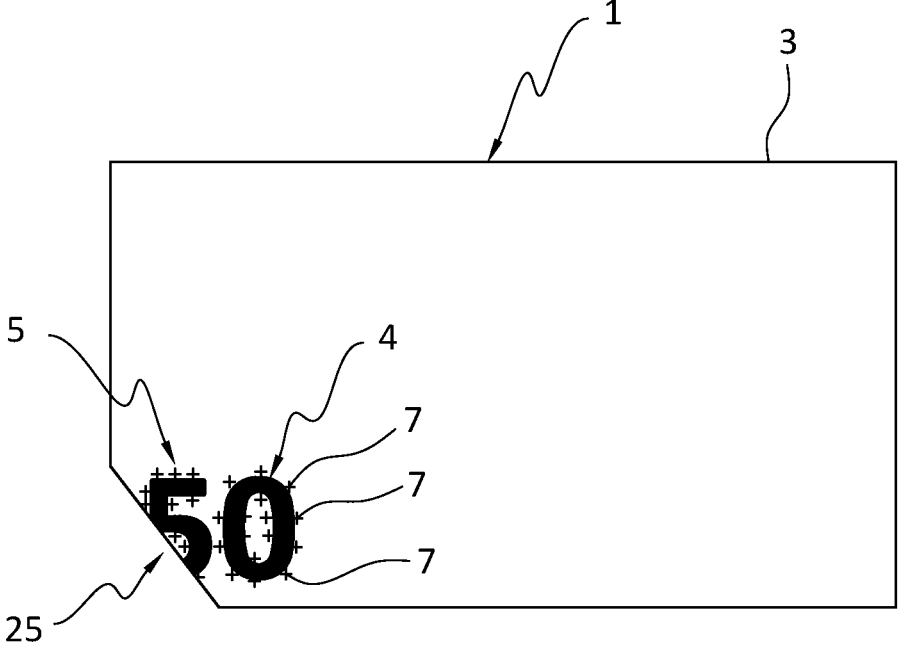
FIG. 6 shows a schematic illustration of a banknote as the search image, wherein the banknote includes a dogear.

FIG. 6 schematically shows an exemplary embodiment of the banknote 3 having the security element 4. The banknote 3 has a dogear 25. At the dogear 25, a corner of the banknote 3 is folded over. The security element 4 can be detected in spite of the dogear due to the robustness of the method. It can thus be sufficient for detecting the object 2 if only a part of the object 2 is depicted in the search image 1.

Figure 7:
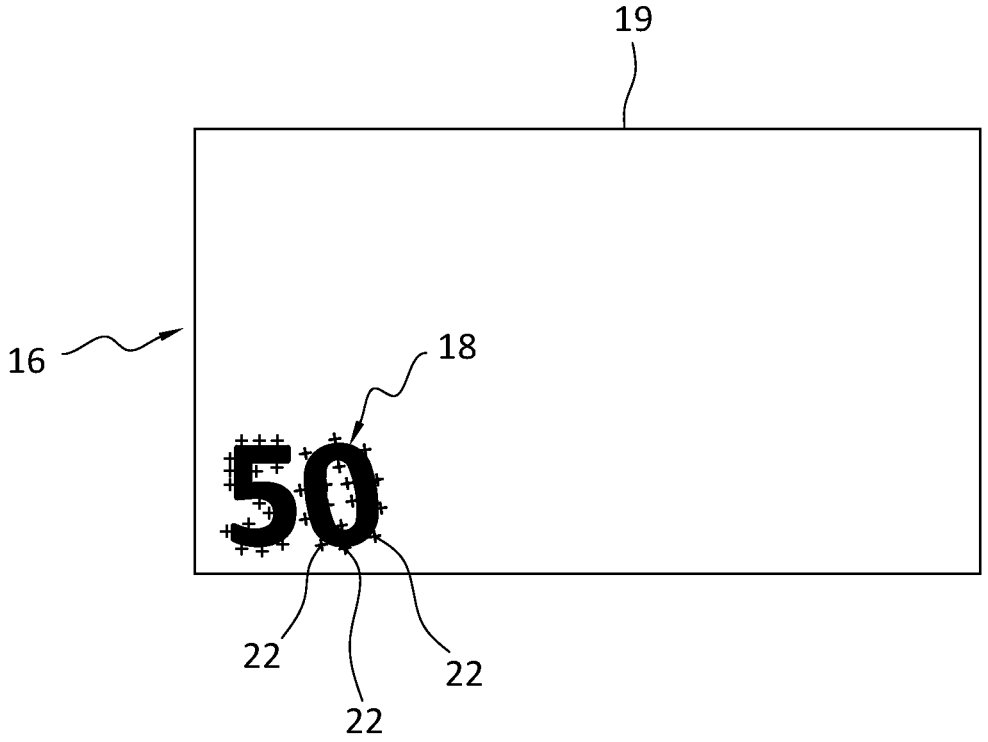
FIG. 7 shows a further schematic illustration of a banknote as the pattern image, wherein a security element of the banknote is recorded distorted.

FIG. 7 schematically shows an exemplary embodiment of the banknote 19. The object 18 formed as the security element has been recorded partially slightly pivoted or distorted. This can occur in particular if the banknote 19 is a used banknote or a banknote from circulation. In this case, it is additionally preferably provided that adjacent pixels of the characteristic pixels are also studied in the training phase to be able to form the pattern vector 5 or the classifier more reliably. This is advantageous since the reliability can then also be increased in the detection of distorted security elements.

The invention claimed is:

1. A method for detecting an object in a search image, having the following steps:
   a) providing a pattern vector, which describes the object by way of coordinates of characteristic pixels;
   b) displacing the pattern vector over various positions of the search image;
   c) defining a respective success value at the various positions; and
   d) detecting the object at the position on the basis of the success value,
      wherein
   a first direction and a second direction different from the first direction is assigned to each characteristic pixel by the pattern vector,
   wherein in each case a first intensity overall value of a first number of one-dimensionally arranged pixels in the first direction is determined and a second intensity overall value of a second number of one-dimensionally arranged pixels in the second direction is determined,
   wherein in each case a difference value is determined between the first intensity overall value and the second intensity overall value,
   wherein the success value is determined on the basis of the respective difference values,
   wherein the object is detected on a banknote.

2. The method according to claim 1, wherein the maximum difference value of the difference values leads to the success value, at which the object is detected.

3. The method according to claim 1, wherein the first direction and the second direction are assigned in opposition by 180°.

4. The method according to claim 1, wherein the first number and/or the second number is defined as greater than one.

5. The method according to claim 1, wherein the first number and/or the second number is defined as less than ten.

6. The method according to claim 1, wherein the first number and/or the second number is defined differently.

7. The method according to claim 1, wherein the pattern vector has at most four values for each characteristic pixel.

8. The method according to claim 1, wherein a security element of a banknote is detected as the object.

9. A method for generating a pattern vector, in which the following steps are carried out:
   a) defining a contour of an object in a pattern image, wherein the object is detected on a banknote;

b) defining a gradient direction for pixels of the contour;

c) defining a gradient amount for pixels of the contour, d) defining pixels of the contour as characteristic pixels if the respective gradient amount is greater than an amount threshold value;

e) defining a respective position of the characteristic pixels;

f) defining a first direction and a second direction in dependence on the gradient direction of the characteristic pixels; and g) generating the pattern vector using the respective position of the characteristic pixels in the pattern image and the first direction and the second direction.

10. The method according to claim 9, wherein the pattern vector is generated using the first direction and/or the second direction relative to the associated characteristic pixel.

11. The use of a method according to claim 1 for determining a position and/or orientation of a security element of a banknote relative to a substrate of the banknote.

\* \* \* \* \*